United States Patent Office 3,218,116
Patented Nov. 16, 1965

3,218,116
PROCESS FOR DYEING WOOL
Richard Casty, Kaiseraugst, Heinz Abel, Reinach, Basel-Land, Arthur Maeder, Therwil, and Alfred Berger, Basel, Switzerland, assignors to Ciba Corporation, New York, N.Y., a corporation of Delaware
No Drawing. Filed Jan. 22, 1963, Ser. No. 253,053
Claims priority, application Switzerland, Mar. 11, 1958, 56,874/58; June 13, 1958, 60,542/58; July 4, 1958, 61,385/58; Oct. 15, 1958, 65,046/58
The portion of the term of the patent subsequent to Sept. 24, 1980, has been disclaimed
11 Claims. (Cl. 8—54)

This application is a continuation in part of application Serial No. 797,845 filed March 9, 1959, now Patent No. 3,104,931.

This invention provides a process for dyeing wool, wherein the wool is treated in an aqueous medium with an azo dyestuff which contains two sulfonic acid groups and is capable of entering into chemical combination with the fibers, and the treatment is carried out in the presence of a compound which corresponds to the formula

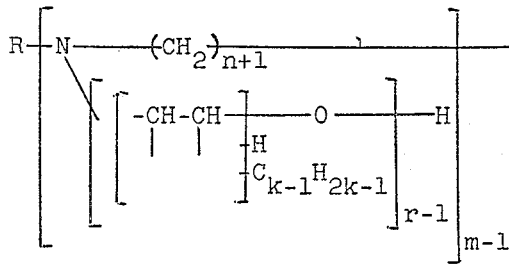

in which R represents an aliphatic hydrocarbon radical containing at least 12 and at the most 22 carbon atoms, $k$, $m$, $n$, $p$, $q$ and $r$ each represent a whole number $k$, $m$ and $n$ each being at the most 2 and the sum $$p+q+(m-1)(r-1)$$

being at least 3 and at the most 20.

The process is also advantageous for dyeing wool in admixture with other nitrogenous fibers or fibers free from nitrogen.

The dyestuffs, with which the wool is dyed, must contain at least one reactive group or reactive substituent. The dyestuffs belong advantageously to the class of azo-dyestuffs, including metal-free or metallizable or metal-liferous mono- or polyazo-dyestuffs, the said dyestuffs containing groups or substituents capable of reacting with the wool. The dyestuffs also contain two sulfonic acid groups.

Among the aforesaid reactive groups or substituents there may be mentioned, for example, ethylene-imide groups, epoxy groups, or the vinyl group in a vinyl-sulfone group or in the radical of acrylic acid, and especially labile substituents capable of splitting off easily with the taking over of the electron pair of the bond.

As labile substituents, which are capable of splitting off with the taking over of the electron pair of the bond, there may be mentioned, for example, aliphatically bound phosphoric or sulfuric acid ester groups, sulfonic acid fluoride groups, aliphatically bound sulfonyloxy groups and above all halogen atoms, especially a mobile chlorine atom. Advantageously the labile substituent is in the γ- or β-position of an aliphatic radical bound directly or through an amino, sulfone or sulfonic acid amide group to the dyesuff molecule. Those dyestuffs which contain halogen atoms as the labile substituents may contain these exchangeable halogen atoms in an aliphatic acyl radical, for example, in the β-position of a propionyl radical, or advantageously in a heterocyclic ring. In the latter case there may be used dyestuffs which contain a monohalogenated heterocyclic ring, for example, a monochlorinated 1:3:5-triazine radical, such as a 1:3:5-triazine radical of the formula (I) 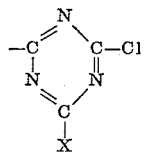

in which X represents an alkyl, aryl, aralkyl, alkylmercapto or aryl - mercapto group, and especially an amino group which may be substituted or a hydroxyl group which is preferably substituted, or dyestuffs which contain a dichlorotriazine radical or a dichloropyrimidine radical.

A large number of dyestuffs of the above kind is known or can be made by methods in themselves known,

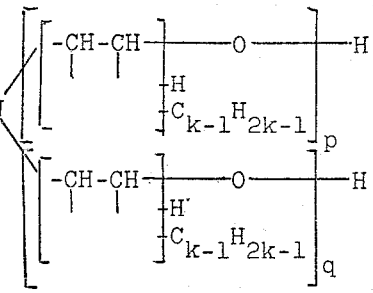

for example, from dyestuff components which contain the aforesaid labile substituents, or into which the labile substituents or radicals containing such labile substituents can be introduced by a method in itself known into the dyestuff after its manufacture. Thus, there are obtained by reacting azo-dyestuffs which contain a reactive hydroxyl, mercapto or preferably —$NH_2$ group, for example, with chloracetylchloride, β-bromo- or β-chloro-propionyl chloride or chloropropionic acid anhydride, or with cyanuric chloride or a primary cyanuric chloride condensation product which contains two chlorine atoms and, instead of the third chlorine atom of the cyanuric chloride, an organic radical, valuable condensation products which contain an exchangeable chlorine atom and are suitable for dyeing by the process of this invention. The group of dynestuffs to be used in the process, which contain a sulfonylated hydroxyl group can be made, for example, by reacting one molecular proportion of a dyestuff which contains a hydroxyalkyl group, for example, a sulfonic acid -N-hydroxalkylamide group or a β-hydroxyalkylsulfonic acid, with at least one molecular proportion of an organic sulfonic acid halide, for example, para-toluene sulfonic acid chloride, benzene sulfonyl chloride or ethane sulfonyl chloride, or with concentrated sulfuric acid or chlorosulfonic acid, in such manner that the hydroxyl group is acylated.

The nitrogenous compounds in the presence of which the process is carried out contain at least one basic nitrogen atom to which is bound at least one radical containing a polyglycol ether chain. This chain consists of at least two

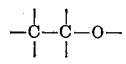

groups and may be bound directly or through a bridge member, for example, an alkylene radical, such as the radical —CH$_2$—CH$_2$—CH$_2$— to the nitrogen atom. The molecule of the nitrogen compound must contain at least three

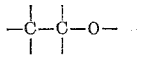

groups, advantageously

—CH$_2$—CH$_2$—O— groups.

Furthermore, the nitrogen compound must contain at least four carbon atoms not belonging to such a group. Thus, it advantageously also contains at least one aliphatic or alicyclic radical having at least 8 carbon atoms bound to one another, preferably an aliphatic radical having at least 12 carbon atoms bound to one another, and also an aromatic radical containing an aliphatic side chain and bound by an aryl carbon atom to the basic nitrogen atom.

It will be understood from the foregoing remarks that there are especially suitable as nitrogenous compounds of the above kind for use in the process reaction products of at least three molecular proportions of an $\alpha$:$\beta$-alkylene oxide with one molecular proportion of an organic compound which contains at least one basic primary or secondary amino group or a basic tertiary amino group, and also an alcoholic hydroxyl group, and salts or quaternary ammonium salts of these compounds.

As starting materials for making the aforesaid reaction products there may be used as $\alpha$:$\beta$-alkylene oxides, ethylene oxide, propylene oxide or glycide. Especially valuable products are obtained from ethylene oxide.

As organic compounds, which contain at least one basic primary or secondary amino group or a basic tertiary amino group and also an alcoholic hydroxyl group, there may be used amines of the aliphatic, aromatic or alicyclic series. Among the aliphatic compounds there may be mentioned monamines, for example, diethylamine, butylamine, hexylamine, dodecylamine, cetylamine, oleylamine, octadecylamine, arachidylamine, dehenyl amine or mixtures of these monamines, or polyamines such as ethylene diamine, propylene diamine, triethylene tetramine or the corresponding N-alkyl-polyamines containing alkyl groups having 8 to 22 carbon atoms. There may also be mentioned basic derivatives of such amines, and esters of hydroxy-amines with higher fatty acids, for example, triethanolamine coconut oil fatty acid ester, or partial amides of polyamines with fatty acids, for example, triethylene tetramine monoacylated with coconut oil fatty acid. Among the amines of the aromatic series there may be mentioned above all amines of the benzene or naphthalene series with alkyl side chains containing, for example, 8 to 18 carbon atoms. From the alicyclic series there are advantageously used resin amines, such as abietylamine, abietyl-methylamine, the amine mixture of tall oil which mixture contains resin amines in addition to higher alkylamines, or hydrogenated abietylamine. There may also be used amidines, such as lauric acid or stearic acid amidine.

For the purpose of this invention suitable products are those obtainable by reacting one molecular proportion of an amine with at least three, for example, 3–20, molecular proportions of an alkylene oxide, for example, the reaction product of one mol of dodecylamine with about six mols of ethylene oxide or of one mol of oleylamine with six, eight or sixteen mols of ethylene oxide, or of one mol of stearylamine with four, eight or sixteen mols of ethylene oxide, the reaction product of a mono- alkyl-propylene diamine, of which the alkyl group is the radical of tallow fatty acid, with eight mols of ethylene oxide, or the reaction product of a monoalkyl-propylene diamine, of which the alkyl group is unbranched and contains sixteen to eighteen carbon atoms, with six mols of ethylene oxide.

From the above remarks it will be apparent that compounds of the formula (2)

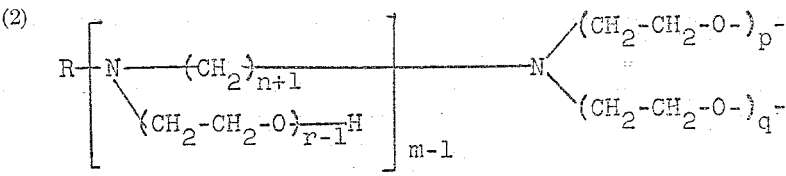

are especially suitable for the process of this invention, in which formula R represents an advantageously unbranched aliphatic hydrocarbon radical containing at least 12, and advantageously 16 to 22, carbon atoms, $m$ and $n$ each represent the whole number 1 or 2, and $p$, $q$ and $r$ represent whole numbers such that the sum $$p+q+(m-1)(r-1)$$

is at least 3 and at most 20, at least one of the symbols $p$, $q$ or $(m-1)(r-1)$ being greater than 1.

The corresponding compounds derived from N-alkyl-diethylene triamine are also useful in the process of the present invention.

If the compounds are prepared from propylene oxide rather than ethylene oxide, they have the formula corresponding otherwise to Formula 2 but containing groups of the composition

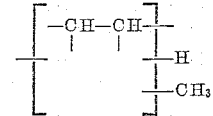

instead of the —CH$_2$—CH$_2$—O— groups. The general formula embracing both the chain formed by ethylene oxide and the chain formed by propylene oxide is

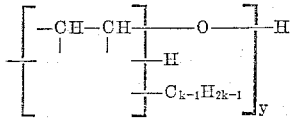

wherein $y$ stands for the symbols $p$, $q$ and $r-1$.

It will also be apparent that nitrogen compounds of the formula (3)

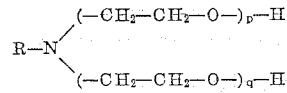

are especially suitable for the process, in which formula R represents an advantageously unbranched aliphatic hydrocarbon radical containing at least 12, and advantageously 16 to 20 carbon atoms, and $p$ and $q$ each represent a whole number such that the sum $p+q$ is at least three and advantageously 8 to 16.

Instead of compounds containing free hydroxyalkyl groups, there may be used the acid esters of these hydroxyalkyl-compounds with polybasic acids, for example, phosphoric or sulfuric acid, or the water-soluble salts of these esters, for example, the alkali metal or ammonium salts or amine salts.

The ethylene oxide addition products are made by the methods customary for making such products. They can be made for example, by reacting the components at a raised temperature. Advantageously the alkylene oxide is added to the amine, not all at once, but gradually by introducing the alkylene oxide, for example, in the gaseous or liquid state, into the amino-compound at a temperature at which the alkylene oxide reacts, for example, at 50–200° C. If desired, the reaction may be carried out in a closed vessel under superatmospheric pressure, advantageously at 2 to 10 atmospheres gauge pressure. The reaction mixture may, if necessary, contain a catalyst. As a catalyst there is advantageously used a substance of alkaline reaction, such as metallic sodium, an alkali metal hydroxide or carbonate or an alkali metal salt of a carboxylic acid of low molecular weight.

The condensation products used in the process are soluble or easily dispersible in water. The solubility in water may, if desired, be increased by introducing groups enhancing solubility in water. Thus, for example, quaternary ammonium salts may be used which contain alkylene glycol chains derived from $\alpha:\beta$-alkylene oxides and are obtained, for example, by the additive combination of an alkylating agent with a reaction product of a primary, secondary or tertiary amine of the kind mentioned above with the alkylene oxide. There may be mentioned the quaternary ammonium salt which is obtained by quarternating with dimethyl sulfate the reaction product of oleylamine with 6 to 10 molecular proportions of ethylene oxide.

Instead of reaction products of alkylene oxide with primary, secondary or tertiary amines of the kind mentioned above, there may be used products which are obtained by introducing into the amines polyglycol ether chains having the appropriate number of ether groups.

The process of the invention is equally advantageous in dyeing or printing. In dyeing from aqueous baths the proportion of the substances to be added thereto may vary within relatively wide limits. The proportions of the dyestuff depends, of course, on the strength of the dyeing desired. It is of advantage to adjust the proportion of the nitrogenous compound relatively to the proportion of the dyestuff so that the ratio of the said compound to dyestuff is within the range of about 1:8 to 1:2. Advantageously the proportion of the nitrogenous compound is about ¼ of the proportion of the dyestuff.

The proportion of the nitrogenous compound should amount to at least 0.25 percent calculated on the weight of the fibers, even when pale dyeings are to be produced, for which less than 1 percent of dyestuff calculated on the weight of the fiber is used.

Furthermore, it has been found advantageous to dye in an acid medium, the pH of the dyebath being maintained between 3 and 6, preferably between 4 and 5; this pH value is advantageously adjusted by adding acetic acid or, if desired, formic or sulfuric acid. It is also of advantage to add sodium sulfate to the dyebath.

As is the general practice when dyeing wool, dyeing is carried out at an elevated temperature, advantageously so that the actual dyeing process is initiated at about 50 to 80° C., the temperature is then raised to the boil, and dyeing is continued and terminated at the boil. It has, however, been observed that it is not at all necessary to raise the temperature close to, or actually to, the boiling point of the dyebath. As a rule, practically equally good results are obtained when the dyeing process is performed below the boil, for example at a temperature from 80 to 90° C.

To ensure that the nitrogenous compound acts reliably from the outset, it is advisable to immerse the material in the dyebath (which contains the acid, if desired sodium sulfate, and the auxiliary) at room temperature or at most a slightly higher temperature, than to raise the temperature of the dyebath and to add the dyestuff in the form of an aqueous solution at an elevated temperature, for example at 50 to 80° C.

As is known, the dyestuffs to be used in the present process are suitable above all for dyeing and printing cellulosic materials by special methods, although some of them have also been proposed for dyeing wool. A large number of these dyestuffs, are not very suitable or even quite unsuitable for dyeing nitrogenous fibers because they produce not only very patchy and above all weak dyeings but also are absorbed very slowly by the material.

It is in fact known that the levelling capacity of wool dyestuffs of poor levelling capacity can be improved by adding addition products of ethylene oxide with certain hydroxy or amino compounds, but these dyestuffs depend for their suitability for dyeing nitrogenous fibers on the normal process of absorption and contain no groups capable of reacting with the fibrous material. It is very surprising that with the dyestuffs to be used in the present process—which are capable of reacting with the fibrous material in a reaction which is fundamentally different from the process involved in dyeing with acid dyestuffs that do not contain reactive substituents—the addition of the nitrogenous compound produces the effect of considerably accelerating the absorption and substantially improving the possible exhaustion of the dyebath so that with otherwise unsuitable dyestuffs very valuable level dyeings are obtained which are distinguished by excellent fastness properties and in general by particularly pure tints.

The present process is also very suitable for printing worsted tops by the slubbing method. The printing pastes used for this purpose contain in addition to at least one dyestuff and an auxiliary of the composition defined above, a thickener such as tragacanth or British gum, and they contain advantageously also an acid, for example acetic acid. They may further contain other additives conventionally incorporated with printing pastes, such as turpentine, hydrotopic substances such as urea and/or agents capable of preventing reduction, such as sodium nitrobenzene sulfonate.

In other respects the procedure conventionally employed in slubbing printing may be followed. The printed material is steamed for 40 to 120 minutes, for example under atmospheric pressure, advantageously with at least one interruption.

The slubbing prints obtained in this manner are distinguished by a good yield and very good fastness properties, more especially good potting stability, fastness to over-printing with acid dyestuffs and to water spotting.

The general practice adopted in direct-printing woollen piece-goods and wool yarns requires the wool to be chlorinated prior to printing to render it more absorbent to the dyestuff. The cumbersome chlorination operation can be dispensed with when the wool is printed by the present process, that is to say with a printing paste that contains the dyestuff and the nitrogenous compound defined above as well as any one or several of the conventional auxiliaries.

Unless otherwise indicated, parts and percentages in the following examples are by weight:

*Example 1*

100 parts of knitting wool, 3000 parts of water, 10 parts of crystalline sodium sulfate, 6 parts of acetic acid of 40% strength and 0.5 part of the addition product of oleylamine and ethylene oxide described below are heated to 80° C. A solution of 2 parts of the dyestuff of the formula (4)

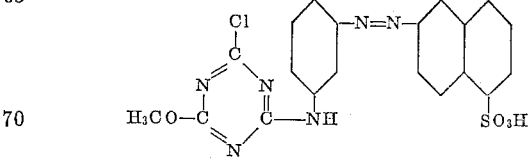

in a small amount of water is added to this dyebath. The bath is raised to the boil within ½ hour, and dyeing is carried out for 1 hour at the boil. The wool is then rinsed and dried. A very pure red dyeing is obtained. When the ethylene oxide addition product is omitted, a skittery, weak, practically useless dyeing is obtained.

The ethylene oxide adduct is prepared thus:

100 parts of commercial oleylamine are mixed with 1 part of finely distributed sodium and heated to 140° C., whereupon ethylene oxide is introduced at 135–140° C. When the ethylene oxide is being consumed rapidly, the reaction temperature is reduced to 120 to 125° C., and the introduction of ethylene oxide continued until 113 parts thereof have been absorbed. The reaction product obtained in this manner gives an almost clear solution in water.

*Example 2*

100 parts of worsted tops, 2000 parts of water, 4 parts of acetic acid of 40% strength and 0.25 part of the ethylene oxide addition product described in the last paragraph of Example 1 are heated to 60° C. A solution of 3 parts of the dyestuff of the formula

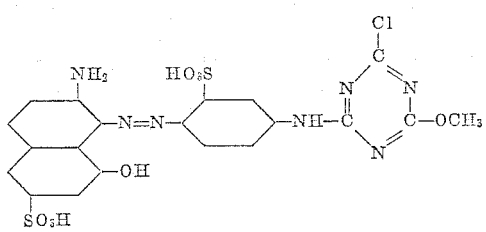

in a small amount of water is then added. In the course of ½ hour the whole is raised to the boil, and dyeing at the boil is continued for 1 hour. The material is then rinsed and dried. A bluish red dyeing is obtained. When the ethylene oxide addition product is omitted, and unsettled, much weaker dyeing results.

A practically identical dyeing is obtained when, after addition of the dyestuff, the temperature is raised to only 85° C. and dyeing is carried out at this temperature for 1 hour.

*Example 3*

A dyebath is prepared from 4000 parts of water, 5 parts of acetic acid of 40% strength, 10 parts of crystalline sodium sulfate, 0.25 part of the ethylene oxide addition product described in the last paragraph of Example 1 and 2 parts of the dyestuff of the formula

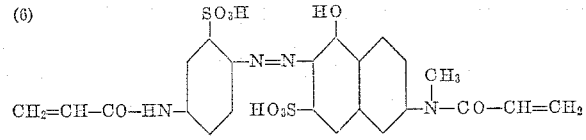

At 60° C. 100 parts of woollen piece-goods are immersed in this dyebath, the temperature is raised to the boil within ½ hour, and dyeing is carried out for 1 hour at the boil. The material is then rinsed and dried. A level orange-red dyeing is obtained. When the ethylene oxide addition product is omitted, a skittery, patchy, commercially useless dyeing results.

A similar dyeing results when the dyestuff of the formula

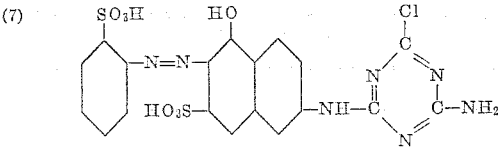

is used.

*Example 4*

With the use of the dyestuff of the formula

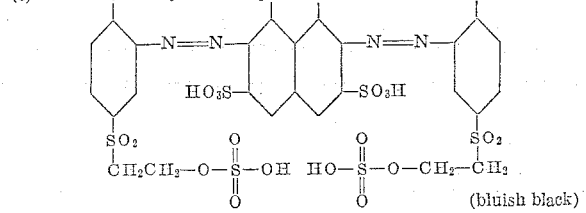

a printing paste is prepared from:

30 parts of dyestuff
50 parts of urea
180 parts of tragacanth thickening 60:1000
25 parts of the ethylene oxide adduct described in the last paragraph of Example 1
15 parts of acetic acid of 80% strength
20 parts of turpentine
680 parts of water 1,000 parts With this printing paste a conventional slubbing print is produced on worsted tops. The printed wool is then steamed for 45 minutes under atmospheric pressure then rinsed for 45 minutes on each occasion with water of 40° C. and with water of 80° C., and finished in the usual manner.

The bluish black slubbing print produced in this manner is distinguished by very good fastness properties, above all by its potting fastness, fastness to over-printing with acid dyestuffs and to water spotting.

*Example 5*

A dyebath is prepared from 4000 parts of water, 5 parts of acetic acid of 40% strength, 0.5 part of a reaction product from octadecylamine and 4 mols of ethylene oxide, and 2 parts of the dyestuff of Formula 5. At 60° C. 100 parts of woollen piece-goods are immersed in this dyebath which is then raised to the boil within ½ hour, and dyeing is carried out at the boil for 1 hour. The material is then rinsed and dried. A level, bluish red dyeing is obtained.

The reaction product from octadecylamine and 4 mols of ethylene oxide used above may be replaced by any one of the following adducts of ethylene oxide:

(a) N-alkyl-propylenediamine (alkyl radicals=radicals of tallow fatty acids) and 8 mols of ethylene oxide;
(b) N-alkyl-propylenediamine or N-alkyl-ethylenediamine (alkyl radicals: straight-chain and saturated, containing 16 to 18 carbon atoms) and 6 mols of ethylene oxide;
(c) Mixture of behenylamine and arachidylamine+8 to 20 mols of ethylene oxide;
(d) Mixture of the amines obtained by reducing the tallow fatty acid amides+6 to 8 mols of ethylene oxide;
(e) N-dodecyl-propylenediamine and 6 mols of ethylene oxide;
(f) Dodecylamine and 3 mols of ethylene oxide;
(g) Dodecylamine and 3 mols of propylene oxide. This propylene oxide addition product is obtained in the following manner:

24 parts of commercial dodecylamine are heated in the presence of 0.13 part of finely distributed sodium to 160° C. in a current of nitrogen. Propylene oxide gas is then introduced until 19.5 parts thereof have been absorbed.

(h) N-octadecyl-diethylenetriamine and 15 to 20 mols of ethyleneoxide.

*Example 6*

A dyebath is prepared from 4000 parts of water, 5 parts of acetic acid of 40% strength, 0.5 part of the ethylene oxide addition product described in the last paragraph of Example 1 and 2 parts of the dyestuff of the formula (9)

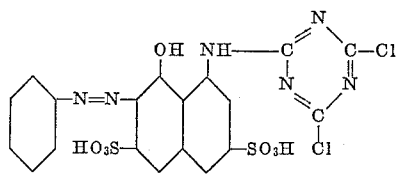

At 60° C. 100 parts of woollen piece-goods are immersed in this dyebath which is then raised to the boil within ½ hour, and dyeing is carried out for 1 hour at the boil. The material is then rinsed and dried. A level red dyeing results.

When dyeing is carried out at 85° C. instead of at the boil, level tints are likewise obtained.

*Example 7*

A dyebath is prepared from 4000 parts of water, 6 parts of acetic acid of 40% strength, 2 parts of the dyestuff of Formula 5 and 1 part of an auxiliary prepared as described under (a) below. At 50° C., 100 parts of woollen piece-goods are immersed in this dyebath which is then gradually raised to the boil. The wool is dyed for 1 hour at the boil, rinsed in cold water and dried. A bluish red, level dyeing results. When the auxiliary is omitted, the resulting dyeing is skittery and practically useless.

A similarly good levelling effect is achieved when wool is dyed in the above manner with the use of the auxiliary mentioned and of the dyestuff of Formula 7.

The dyeing assistant is prepared in the following manner:

(a) 79 parts (0.3 mol) of a mixture of fatty amines consisting of 30% of hexadecylamine, 25% octadecylamine and 45% of octadecenylamine are reacted with ethylene oxide in the presence of 0.8 part of sodium until 106 parts (2.4 mols) of ethylene oxide have been absorbed.

At the start the reaction temperature is 140 to 150° C. and can be reduced gradually to 120 to 125° C.

30.75 parts (0.05 mol) of the resulting ethylene oxide addition product are mixed in a stirring flask at 60° C. within 15 minutes with 5.4 parts of urea and then within 30 minutes with 5.4 parts of sulfamic acid (0.05 mol+10%), and the whole is heated for 5 to 6 hours on a boiling water bath under nitrogen.

The resulting product (41 parts) is readily soluble in water and of neutral reaction.

Similar results are obtained by dyeing wool as described in the first paragraph of this example, with the exception that the auxiliary prepared as described under (a) above is replaced by any one of the auxiliaries prepared as described below:

(b) 31.2 parts of urea and 27.6 parts (about 0.17 mol) of urea phosphate are mixed and heated in a flask. Above 70° C., the mixture is raised with stirring within 1 to 1½ hours to 155° C., maintained for 30 minutes at 155 to 160° C., and then allowed to cool to about 130° C. 49.2 parts (0.08 mol) of the ethylene oxide adduct described under (a) above are then added, and the whole is heated for 2 hours at 140 to 145° C. under nitrogen, cooled to 110° C., mixed with water and the final weight is adjusted to 106 parts, to yield a clear solution of neutral reaction (of 25% strength, calculated from the ethylene oxide adduct used).

(c) 79 parts of the mixture of fatty amines mentioned under (a) above are reacted as described above with ethylene oxide in the presence of 0.8 part of sodium until 53 parts of ethylene oxide have been absorbed.

43.8 parts (0.1 mol) of the resulting ethylene oxide adduct are reacted as described under (a) above with 10.75 parts of urea and 10.75 parts of sulfamic acid; final weight: 64.9 parts.

*Example 8*

A printing paste is prepared from:

30 parts of dyestuff of Formula 5
   200 parts of urea
   500 parts of tragacanth thickening 80:1000
    60 parts of acetic acid of 40% strength
    15 parts of the ethylene oxide adduct described in the last paragraph of Example 1
    10 parts of sodium meta-nitrobenzenesulfonate
   185 parts of water 1,000 parts A piece of unchlorinated woven wool fabric is printed with this paste in the conventional manner, and then steamed for 15 minutes in a star steamer or in a continuous steamer, rinsed in water and finished as usual. A strong, level, bluish red print is obtained. Without the ethylene oxide addition product the print is tinctorially weak, skittery and unfit for practical use.

What is claimed is:

1. A process for dyeing wool with acid dyestuffs, which comprises treating the wool in an aqueous medium with an azo dyestuff which contains two sulfonic acid groups and is capable of entering into chemical combination with the wool, and carrying out the treatment in the presence of a compound which corresponds to the formula

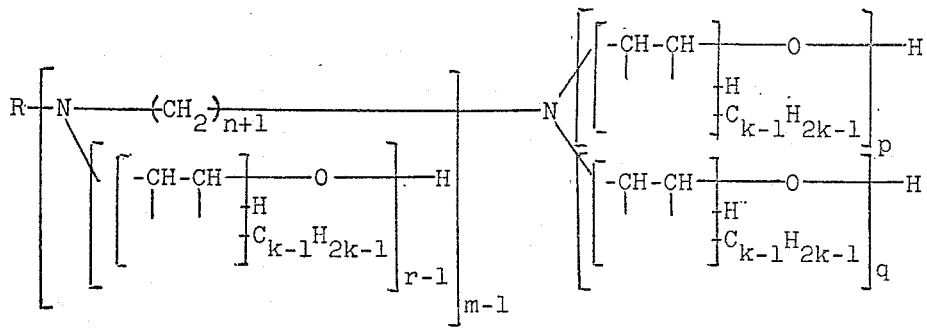

in which R represents an aliphatic hydrocarbon radical containing at least 12 and at the most 22 carbon atoms, $k$, $m$, $n$, $p$, $q$ and $r$ each represent a whole number, $k$, $m$ and $n$ each being at the most 2 and the sum $p+q+(m-1)(r-1)$ being at least 3 and at the most 20.

2. A process for dyeing wool with acid dyestuffs, which comprises treating the wool in an aqueus medium with an azo dyestuff which contains two sulfonic acid groups and is capable of entering into chemical combination with the wool, and carrying out the treatment in the presence of an ester of an at least dibasic acid and a hydroxy compound of the formula

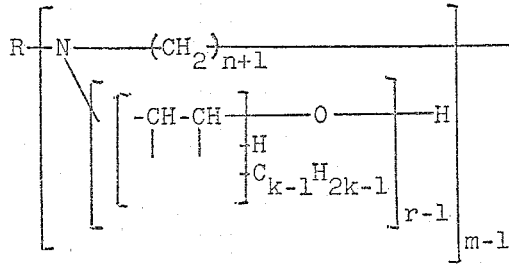

in which R represents an aliphatic hydrocarbon radical containing at least 12 and at the most 22 carbon atoms, $k$, $m$, $n$, $p$, $q$ and $r$ each represent a whole number, $k$, $m$ and $n$ each being at the most 2 and the sum $$p+q+(m-1)(r-1)$$

being at least 3 and at the most 20.

3. A process for dyeing wool with acid dyestuffs, which comprises treating the wool in an aqueous medium with an azo dyestuff which contains two sulfonic acid groups and at least one reactive halogen atom and carrying out the treatment in the presence of a compound of the formula

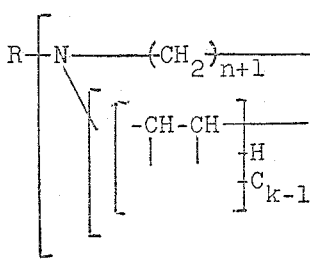

in which R represents an aliphatic hydrocarbon radical containing at least 12 and at the most 22 carbon atoms, $k$, $m$, $n$, $p$, $q$ and $r$ each represent a whole number, $k$, $m$ and $n$ each being at the most 2 and the sum $$p+q+(m-1)(r-1)$$

being at least 3 and at the most 20.

4. A process for dyeing wool with acid dyestuffs, which comprises treating the wool in an aqueous medium with

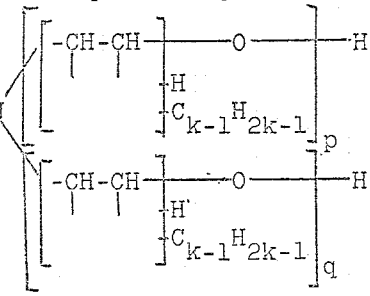

an azo dyestuff which contains two sulfonic acid groups and at least one reactive halogen atom and carrying out the treatment in the presence of an ester of an at least dibasic acid and a hydroxy compound of the formula

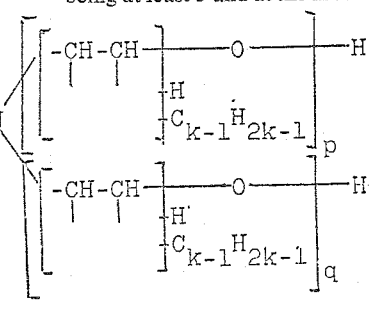

in which R represents an aliphatic hydrocarbon radical containing at least 12 and at the most 22 carbon atoms, $k$, $m$, $n$, $p$, $q$ and $r$ each represent a whole number, $k$, $m$ and $n$ each being at the most 2 and the sum $$p+p+(m-1)(r-1)$$

being at least 3 and at the most 20.

5. A process for dyeing wool with acid dyestuffs, which comprises treating the wool in an aqueous medium with an azo dyestuff which contains two sulfonic acid groups and a chloro-1:3:5-triazine radical and carrying out the treatment in the presence of a compound of the formula

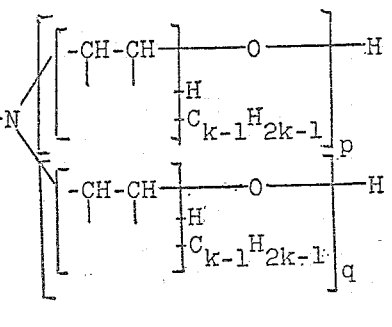

in which R represents an aliphatic hydrocarbon radical containing at least 12 and at the most 22 carbon atoms, $k$, $m$, $n$, $p$, $q$ and $r$ each represent a whole number, $k$, $m$ and $n$ each being at the most 2 and the sum $$p+q+(m-1)(r-1)$$

being at least 3 and at the most 20.

6. A process for dyeing wool with acid dyestuffs, which comprises treating the wool in an aqueous medium with an azo dyestuff which contains two sulfonic acid groups and a chloro-1:3:5-triazine radical and carrying out the treatment in the presence of an ester of an at least dibasic acid and a hydroxy compound of the formula

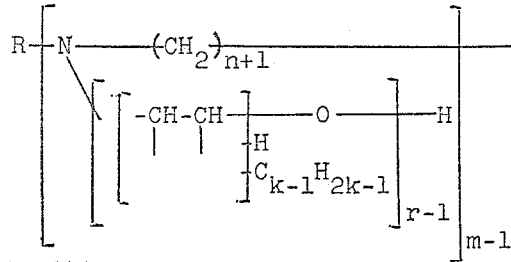

in which R represents an aliphatic hydrocarbon radical containing at least 12 and at the most 22 carbon atoms, $k$, $m$, $n$, $p$, $q$ and $r$ each represent a whole number, $k$, $m$ and $n$ each being at the most 2 and the sum $$p+q+(m-1)(r-1)$$

being at least 3 and at the most 20.

7. A process for dyeing wool in the slubbing printing process with acid dyestuffs, which comprises treating the wool in an aqueous medium with an azo dyestuff which contains two sulfonic acid groups and a chloro-1:3:5-triazine radical and carrying out the treatment in the presence of a compound of the formula

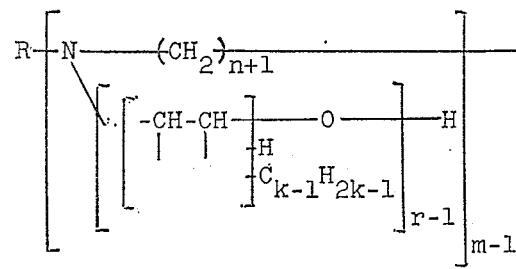

in which R represents an aliphatic hydrocarbon radical containing at least 12 and at the most 22 carbon atoms, $k$, $m$, $n$, $p$, $q$ and $r$ each represent a whole number, $k$, $m$ and $n$ each being at the most 2 and the sum $$p+q+(m-1)(r-1)$$

being at least 3 and at the most 20.

8. A process for dyeing wool with acid dyestuffs, which comprises treating the wool in an aqueous medium with an azo dyestuff which contains two sulfonic acid groups and is capable of entering into chemical combination with the wool, and carrying out the treatment in the presence of a compound which corresponds to the formula

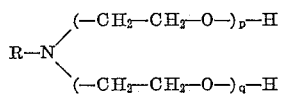

in which R represents an unbranched aliphatic hydrocarbon radical containing at least 12 and at the most 22 carbon atoms, and $p$ and $q$ each represent whole numbers, the sum $p+q$ being at least 3 and at the most 20.

9. A process for dyeing wool with acid dyestuffs, which comprises treating the wool in an aqueous medium with an azo dyestuff which contains two sulfonic acid groups and a chloro-1:3:5-triazine radical and carrying out the treatment in the presence of a compound which corresponds to the formula

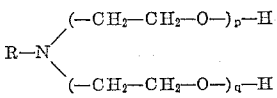

in which R represents an unbranched aliphatic hydrocarbon radical containing at least 12 and at the most 22 carbon atoms, and $p$ and $q$ each represent whole numbers, the sum $p+q$ being at least 3 and at the most 20.

10. A process for dyeing wool with acid dyestuffs, which comprises treating the wool in an aqueous medium with an azo dyestuff which contains two sulfonic acid groups and is capable of entering into chemical combination with wool, and carrying out the treatment in the presence of an addition product of one molecular proportion of oleylamine and about 6 to 9 molecular proportions of ethylene oxide.

11. A process for dyeing wool with acid dyestuffs, which comprises treating the wool in an aqueous medium with an azo dyestuff which contains two sulfonic acid groups and is capable of entering into chemical combination with the wool, and carrying out the treatment in the presence of an addition product of one molecular proportion of N-alkyl-propylenediamines, the alkyl radicals of which are the same as those of tallow fatty acids, and about 8 molecular proportions of ethylene oxide.

References Cited by the Examiner

UNITED STATES PATENTS

| | | | |
|---|---|---|---|
| 1,970,578 | 8/1934 | Schoeller et al. | 8—93 X |
| 2,681,845 | 6/1954 | Luttringhaus | 8—36 |
| 3,104,931 | 9/1963 | Casty et al. | 8—54 |

OTHER REFERENCES

Townend: Jour. Soc. Dyers & Col., June 1945, pp. 144–149, particularly p. 146.

Barritt et al.: J.S.D.C., January 1948, pp. 20–27 and 29–32, particularly p. 25.

NORMAN G. TORCHIN, *Primary Examiner.*

ABRAHAM H. WINKELSTEIN, *Examiner.*